US009035851B2

(12) United States Patent
Noma

(10) Patent No.: US 9,035,851 B2
(45) Date of Patent: May 19, 2015

(54) PORTABLE TERMINAL, DISPLAY APPARATUS, LUMINANCE CONTROL METHOD AND LUMINANCE CONTROL PROGRAM

(75) Inventor: Kenichi Noma, Osaka (JP)

(73) Assignee: KYOCERA Corporation, Kyoto (JP)

( * ) Notice: Subject to any disclaimer, the term of this patent is extended or adjusted under 35 U.S.C. 154(b) by 100 days.

(21) Appl. No.: 13/440,684

(22) Filed: Apr. 5, 2012

(65) Prior Publication Data

US 2012/0256859 A1 Oct. 11, 2012

(30) Foreign Application Priority Data

Apr. 5, 2011 (JP) .................................. 2011-038438

(51) Int. Cl.
| G09G 5/00 | (2006.01) |
| G09G 5/10 | (2006.01) |
| G09G 5/14 | (2006.01) |
| G06F 3/14 | (2006.01) |

(52) U.S. Cl.
CPC .................. *G09G 5/003* (2013.01); *G09G 5/10* (2013.01); *G09G 5/14* (2013.01); *G09G 2320/06* (2013.01); *G09G 2360/144* (2013.01); *G06F 3/1423* (2013.01); *G09G 2320/062* (2013.01); *G09G 2330/021* (2013.01)

(58) Field of Classification Search
CPC ... G06F 3/1423; G06F 3/1431; G06F 3/1446; G06F 3/147; G09G 2300/026
USPC ........................... 345/1.1–1.3, 505, 506, 173; 361/679.21; 710/1, 18, 51, 58
See application file for complete search history.

(56) References Cited

U.S. PATENT DOCUMENTS

| 6,144,358 | A | * | 11/2000 | Narayanaswamy et al. .. 345/102 |
| 2002/0149549 | A1 | * | 10/2002 | Ohta et al. ....................... 345/87 |
| 2004/0001051 | A1 | | 1/2004 | Tomizawa et al. |
| 2007/0103385 | A1 | * | 5/2007 | Lian et al. ....................... 345/1.1 |
| 2009/0102744 | A1 | * | 4/2009 | Ram ............................... 345/1.1 |
| 2011/0012931 | A1 | | 1/2011 | Abe |

FOREIGN PATENT DOCUMENTS

| JP | 2002-368842 A | 12/2002 |
| JP | 2004-030536 A | 1/2004 |
| JP | 2006-311224 A | 11/2006 |
| JP | 2008-236144 A | 10/2008 |
| JP | 2009-223486 A | 10/2009 |
| WO | 03/077098 A1 | 9/2003 |

OTHER PUBLICATIONS

An Office Action; "Notice of Reasons for Rejection," issued by the Japanese Patent Office on Oct. 28, 2014, which corresponds to Japanese Patent Application No. 2011-083438 and is related to U.S. Appl. No. 13/440,684; with English language concise explanation.

* cited by examiner

*Primary Examiner* — Shaheda Abdin
(74) *Attorney, Agent, or Firm* — Studebaker & Brackett PC

(57) ABSTRACT

A portable terminal, a display apparatus, a luminance control method and a control program are provided. The portable terminal includes a plurality of display units, and a luminance control unit which, in response to an input operation performed for a first display unit of the plurality of display units at a state where images are visibly displayed on the respective display units, performs a luminance control of decreasing a display luminance of a second display unit of the plurality of display units to be lower than a current luminance thereof, the second display unit being different from the first display unit.

16 Claims, 9 Drawing Sheets

PORTABLE TERMINAL, DISPLAY APPARATUS, LUMINANCE CONTROL METHOD AND LUMINANCE CONTROL PROGRAM

CROSS-REFERENCE TO RELATED APPLICATION

This application claims priority from Japanese Patent Application No. 2011-083438, filed on Apr. 5, 2011, the entire subject matter of which is incorporated herein by reference.

BACKGROUND OF THE INVENTION

1. Field of the Invention

The present invention relates to a portable terminal having a plurality of display units, such as portable telephone, and more particularly, to a luminance control technique of each display unit.

2. Description of the Related Art

JP 2008-236144 describes a technique of reducing power consumption of a portable terminal such as portable telephone so as to prolong battery life.

According to the technique of JP 2008-236144, at a state where a backlight which is provided to an operation unit so as to improve visibility of keys is turned on, brightness of the backlight is reduced when any input is not made to the operation unit for a predetermined time or longer.

In recent years, a portable terminal having a plurality of display units has been proposed. In order to reduce the power consumption, it is conceivable that the technique of JP 2008-236144 were also applied to the portable terminal to reduce display luminance of each display unit when there is no user operation made for a predetermined time period.

However, even if the technique of JP 2008-236144 were applied to the portable terminal having a plurality of display units, it would be not possible to reduce the power consumption while the user is operating the portable terminal.

SUMMARY OF THE INVENTION

The present invention has been made in view of the above circumstances, and an aspect of the present invention provides a portable terminal having a plurality of display units and capable of reducing power consumption even while a user is operating the portable terminal.

According to an illustrative embodiment of the present invention, there is provided a portable terminal comprising: a plurality of display units; and a luminance control unit which, in response to an input operation performed for a first display unit of the plurality of display units at a state where images are visibly displayed on the respective display units, performs a luminance control of decreasing a display luminance of a second display unit of the plurality of display units to be lower than a current luminance thereof, the second display unit being different from the first display unit.

According to the portable terminal having the above configuration, it is possible to reduce the power consumption even while a user is operating the portable terminal.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION OF THE INVENTION

Hereinafter, a portable telephone (an example of a portable terminal) according to an illustrative embodiment of the present invention will be described.

<Overview>

A portable telephone of the illustrative embodiment has two touch panel units. At a state where a display mode is a multi-mode, when an input by touch of a user's finger is made on one touch panel unit, a backlight of the other touch panel unit is turned off, so that power consumption is reduced.

The portable telephone can switch a display mode between the multi-mode and a single mode.

The multi-mode refers to a mode in which images instructed by two different applications being executed are displayed on respective touch panel units. Also, the single mode refers to a mode in which images instructed by a single application being executed are displayed on the respective touch panel units.

Here, it is thought that relevance between images, which are displayed on the respective touch panel units in the multi-mode, is lower, compared to relevance between images, which are displayed on the respective touch panels in the single mode. The reason is because the images displayed on the respective touch panel units in the multi-mode are images which are respectively instructed by two different applications being executed.

Accordingly, in the multi-mode, even if the display on the other touch panel unit becomes invisible while a user operates the one touch panel unit, it is thought that the user's operability is not deteriorated so much.

In contrast, in the single mode, for example, when one large image is divided and displayed in the respective touch panels, if the display on the other touch panel unit becomes not visible, it is thought that the user cannot perform the smooth operation, i.e., the user feels the deterioration of the operability relatively strongly.

According to the portable telephone of this illustrative embodiment, when the display mode is the multi-mode, the backlight of the other touch panel unit to which any input is not made is turned off. Thereby, it is possible to reduce the power consumption while maintaining the operability.

<Apparatus Configuration>

First, an apparatus configuration of the portable telephone 100 according to this illustrative embodiment is described.

Figure 1A:
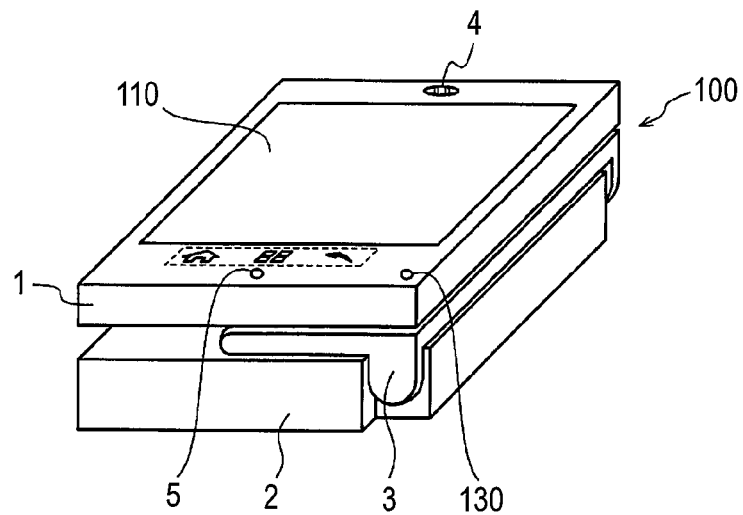
FIGS. 1A to 1C show an outward appearance of a portable telephone according to an illustrative embodiment at a closed state and an open state.
Figure 1B:
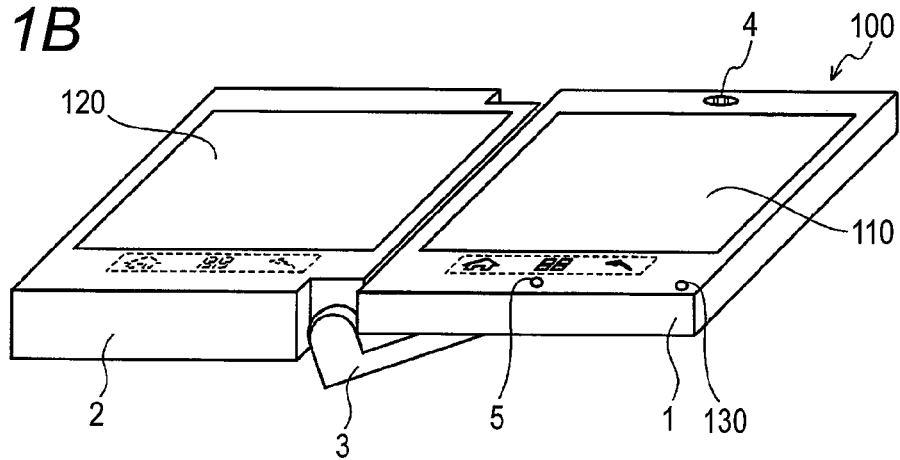
Figure 1C:
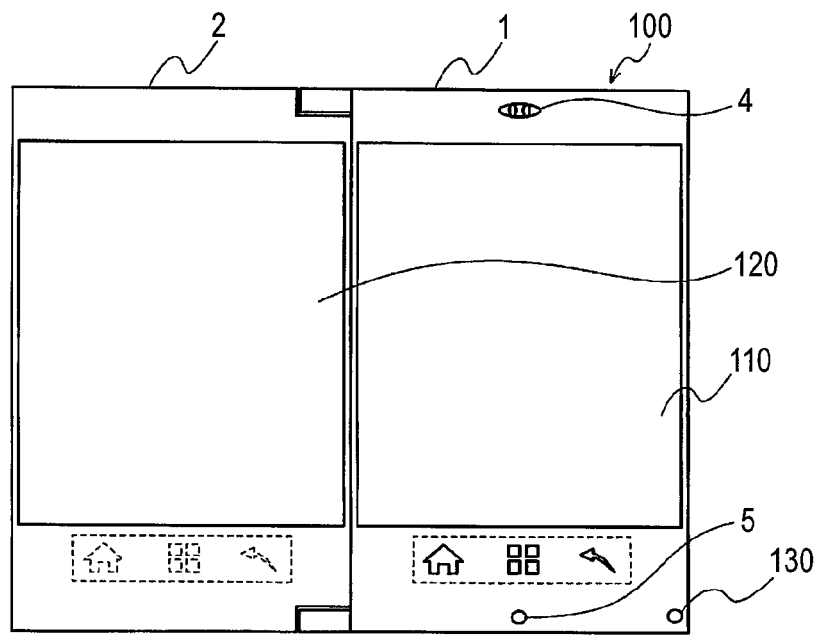

FIG. 1A is a perspective view showing an outward appearance of the portable terminal 100 at a closed state, FIG. 1B is a perspective view showing an outward appearance of the portable terminal 100 at an open state and FIG. 1C is a front view showing the outward appearance of the portable terminal 100 at the open state.

As shown in FIGS. 1A to 1C, the portable telephone 100 is a slide-type terminal having a first housing 1 and a second housing 2 which can be relatively moved, and has the first housing 1, the second housing 2 and an arm 3 which connects the first housing 1 and the second housing 2 each other.

The first housing 1 has a speaker 4, a microphone 5, a touch panel unit 110, an optical sensor 130 and a touch key unit 140 and the second housing 2 has a touch panel unit 120 and a touch key unit 150.

The arm 3 has a base end which is rotatably shaft-supported to the second housing 2 and a tip end which slidably and rotatably supports the first housing 1.

Accordingly, the portable telephone 100 is enabled to relatively rotate the first housing 1 and the second housing 2 and to change between a closed state and an open state.

As shown in FIG. 1A, the portable telephone 100 takes a closed state where the first housing 1 overlaps with the second housing 2 and the touch panel unit 120 is invisible and an open state where a main surface of the first housing 1 and a main surface of the second housing 2 become the substantially same, as shown in FIGS. 1B and 1C, as the first housing 1 is moved along the main surface of the second housing 2 by the arm from the closed state, and the touch panel unit 110 and the touch panel unit 120 are visible.

Here, a surface of each housing on which the touch panel unit is provided is referred to as the main surface.

<Specification of User Interface>

In the below, display examples and operation examples on the portable telephone 100 are described with reference to FIGS. 2A and 2B, and 3A and 3B.

Figure 2A:
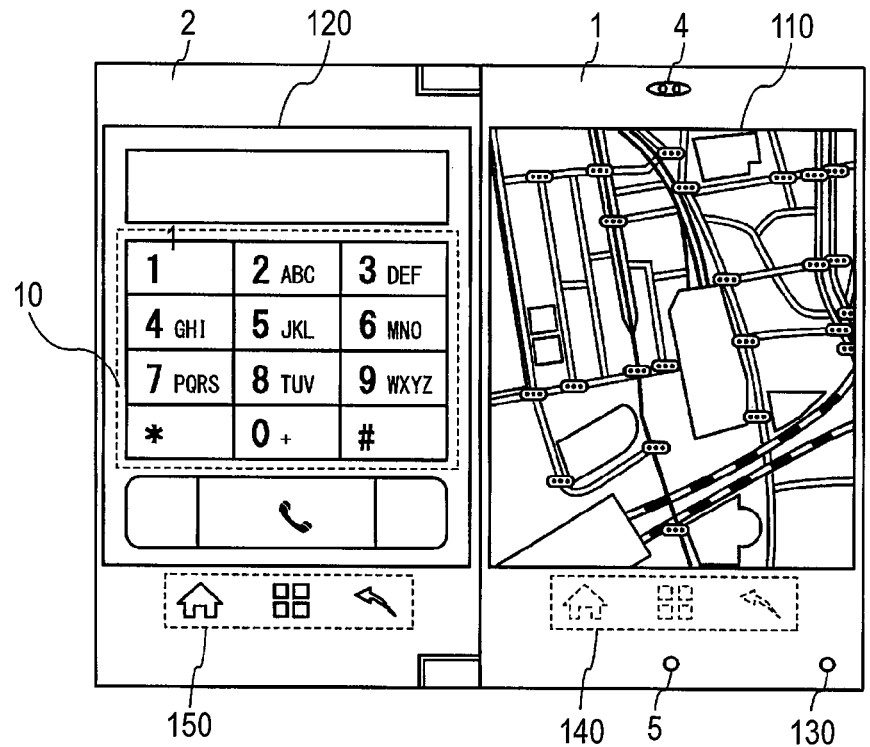
FIGS. 2A and 2B show display examples on respective touch panel units and a user operation example when a display mode is a multi mode.
Figure 2B:
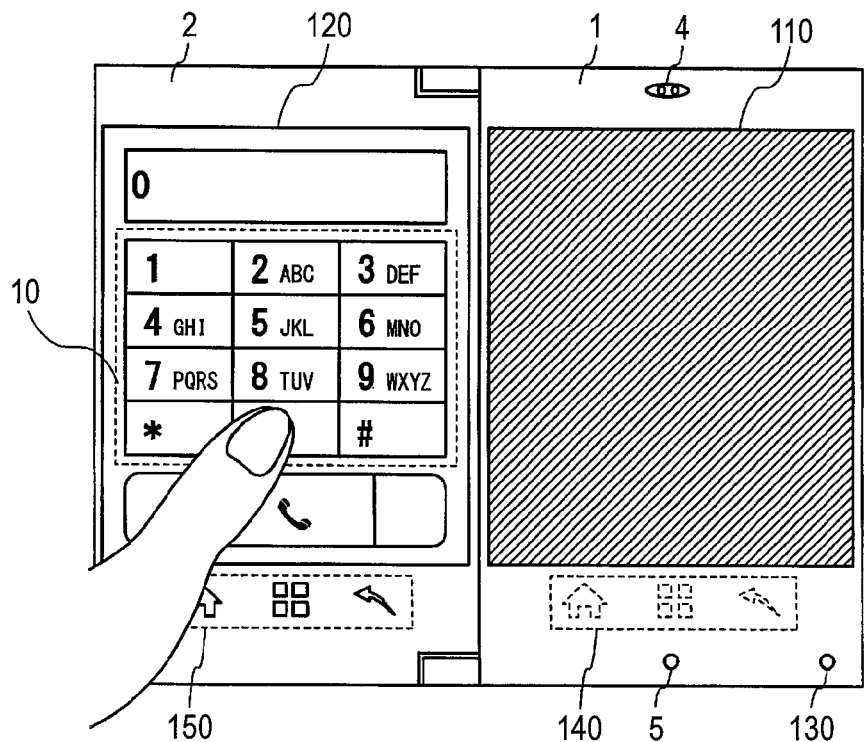

FIGS. 2A and 2B show display examples on the respective touch panel units and a user operation example when a display mode is the multi-mode.

FIG. 2A shows an example in which an image (map image) instructed from an image display application is displayed on the touch panel unit 110 and an image including a number pad 10 instructed from a call application is displayed on the touch panel unit 120.

At the state, when the user touches a "0" key of the number pad 10 displayed on the touch panel unit 120 with a finger, for example, the portable telephone 100 turns off the backlight of the touch panel unit 110 which the user does not touch with a finger, as shown in FIG. 2B.

In the meantime, when the user touches the touch panel unit 110, in which the backlight is turned off, with a finger and the like so as to perform an operation, the portable telephone 100 turns on the backlight of the touch panel unit 110 with the substantially same luminance level as the backlight of the touch panel unit 120.

Figure 3A:
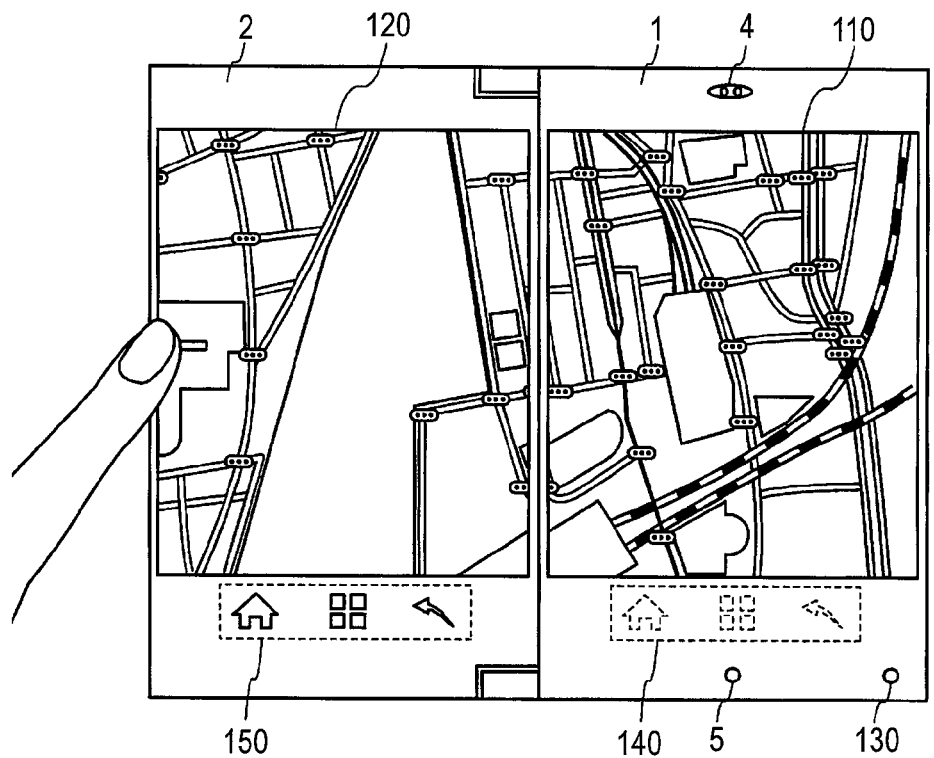
FIGS. 3A and 3B show display examples on the respective touch panel units and a user operation example when the display mode is a single mode.
Figure 3B:
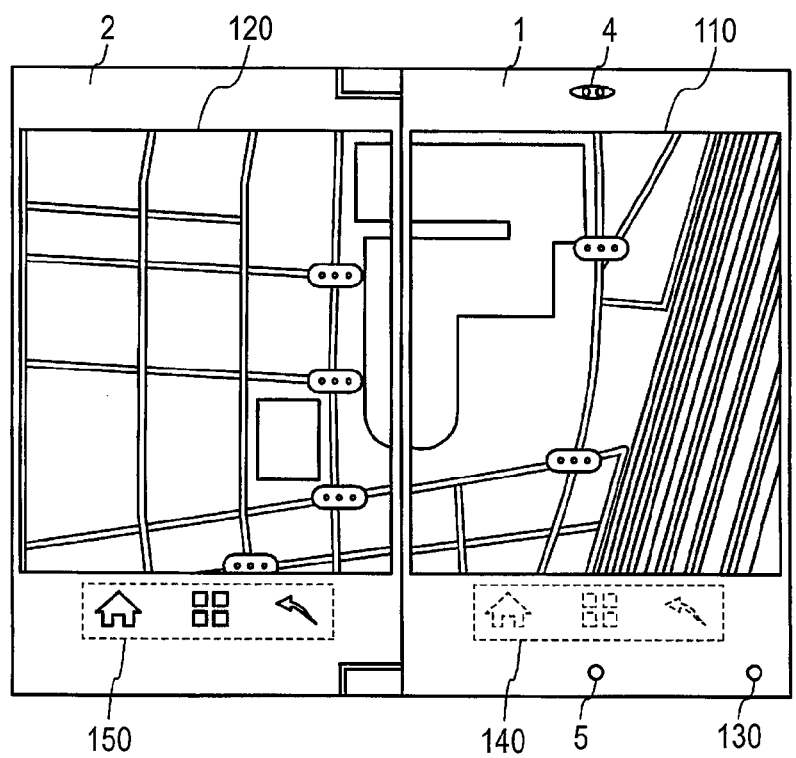

FIGS. 3A and 3B show display examples on the respective touch panel units and a user operation example when the display mode is the single mode.

FIG. 3A shows an example in which one image (map image) instructed from the image display application is divided and displayed on the touch panel units 110, 120, respectively.

When the user touches the touch panel unit 120 with a finger, an enlarged map image of the map image shown in FIG. 3A, which is instructed from the image display application, is divided and displayed on the respective touch panel units, as shown in FIG. 3B. At this time, the portable telephone 100 maintains the backlights of the respective touch panel units 110, 120 turned on.

The reason of employing above configuration is as follows. In the single mode, the image (in this example, one map image) having high relevance instructed by the same (single) application (in this example, the image display application) is displayed on the respective touch panel units. Therefore, it is thought that the operability is largely deteriorated if the screens of the respective touch panel units are not seen at the same time.

On the other hand, in the multi-mode, as shown in FIG. 2A, the images having low relevance instructed by different applications are displayed on the respective touch panel units. Therefore, it is thought that the user less feels the deterioration of the operability, compared to the single mode.

Accordingly, only in the multi-mode, the portable telephone 100 turns off the backlight of the other touch panel unit when the touch input is made on the one touch panel unit with the user's finger and the like. Thereby, it is possible to reduce the power consumption while maintaining the operability.

In the meantime, as specifically described later, while turning off the backlight of the other touch panel unit, the portable telephone 100 stops an update of the display on the other touch panel unit and switches an operating state of a controller of the other touch panel unit into a power saving state. Thereby, it is possible to further reduce the power consumption.

<Function Configuration>

Figure 4:
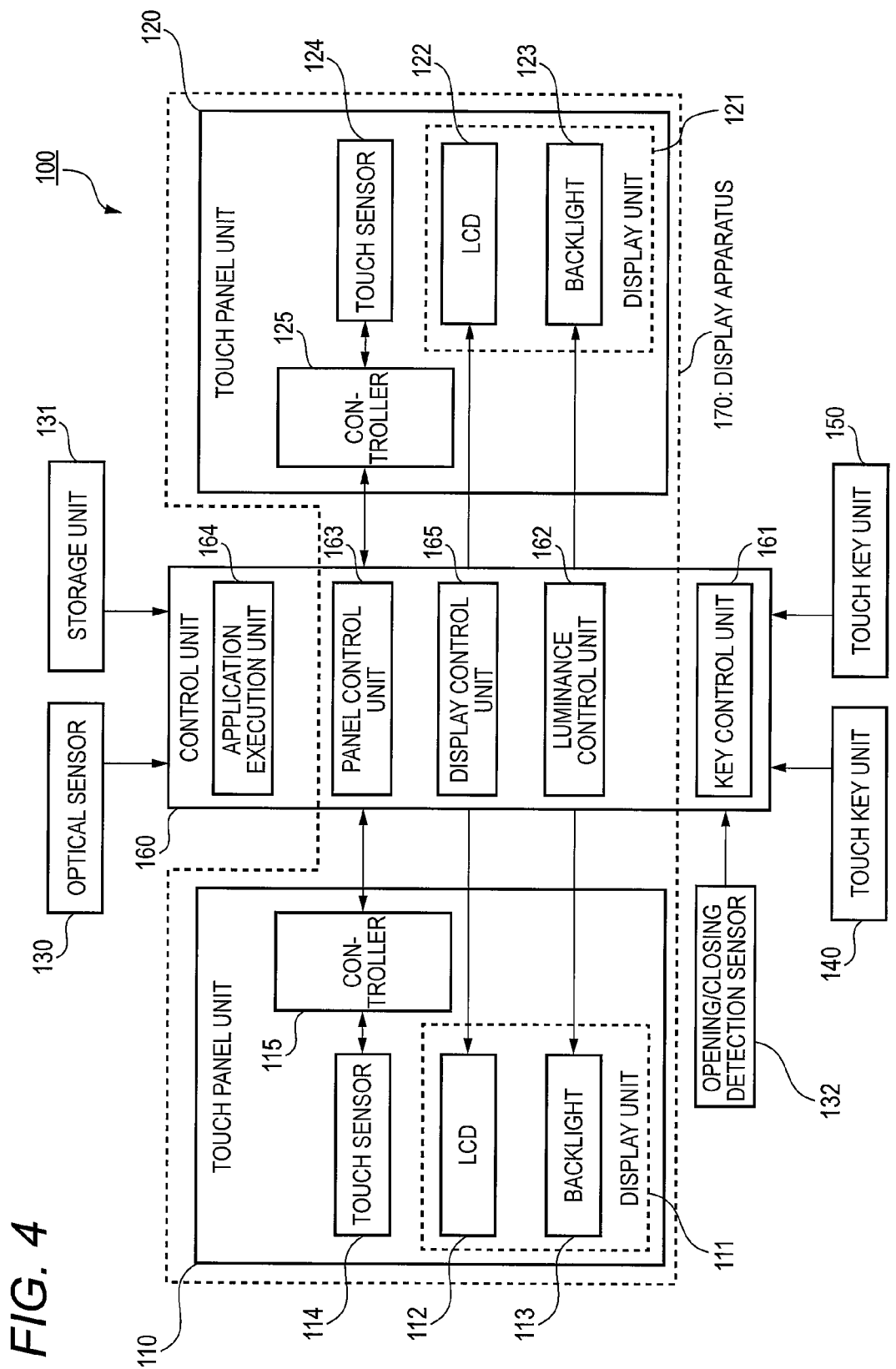
FIG. 4 is a block diagram showing a functional configuration of respective units of the portable telephone 100.

FIG. 4 is a block diagram showing a functional configuration of respective units of the portable telephone 100.

As shown in FIG. 4, the portable telephone 100 includes a display apparatus 170 (an example of a display apparatus), and has the touch panel units 110, 120, the optical sensor 130, a storage unit 131, an opening/closing detection sensor 132, the touch key units 140, 150 and a control unit 160.

In the meantime, the portable telephone 100 has a communication unit which a typical portable telephone has, the speaker 4 and the microphone 5 shown in FIG. 1, which are not shown in FIG. 4. Also, the portable telephone 100 includes a processor and a memory, and functions of the control unit 160 are implemented as the processor executes programs stored in the memory.

Here, the touch panel unit 110 includes a display unit 111, a touch sensor 114 and a controller 115, and the touch panel unit 120 includes a display unit 121, a touch sensor 124 and a controller 125.

Also, the display unit 111 includes an LCD (Liquid Crystal Display) 112 and a backlight 113, and the display unit 121 includes an LCD 122 and a backlight 123.

The respective backlight 113, 123 are edge light-type LED backlights and emit light with brightness corresponding to input current.

The respective touch sensors 114, 124 are electrostatic capacity-type touch sensors. The touch sensor 114 is provided to overlap with the LCD 112 and the touch sensor 124 is provided to overlap with the LCD 122.

In the meantime, each touch sensor includes a transparent member and is configured such that an image displayed on each LCD is viewable.

Each of the controllers 115, 125 is an IC (Integrated Circuit) which detects the touch of the user's finger and the like on the corresponding touch sensor and outputs a coordinate value (x, y) of a touch position on the touch sensor every predetermined time (for example, 25 ms) while detecting the touch, in a normal state. In the meantime, the corresponding touch sensor refers to the touch sensor which is included in the touch panel unit including the controller.

Also, each controller can switch the operating state thereof between the normal state and a power saving state, in response to an instruction from the control unit 160. In the power saving state, when each controller detects the touch of the user's finger and the like on the corresponding touch sensor, the controller notifies the control unit 160 that the touch is detected, without outputting the coordinate value of the touch position. In the below, the notification is referred to as 'detection notification.'

Also, the optical sensor 130 is a circuit which detects brightness of the surrounding and outputs a signal of a voltage level corresponding to the detected brightness to the control unit 160, and is implemented by a photo diode, for example.

Also, the storage unit 131 has a function of storing programs for various applications (call application, image display application, mail application, web browser and the like) and data which the applications require.

Also, the opening/closing detection sensor 132 has a function of outputting a signal (hereinafter, referred to as 'opening/closing state signal') indicating whether the portable telephone 100 is at the open state or at the closed state. The opening/closing detection sensor 132 detects magnetic force of a magnet embedded in one of one side surface of the first housing 1 and one side surface of the second housing 2, which are in contact with each other at the open state, by a Hall sensor embedded in the other side surface and outputs a signal indicating the detection, as the opening/closing state signal indicating the open state, at the time of detection.

Also, each touch key unit 140, 150 includes three keys and has a function of outputting a signal corresponding to a key located at a position which the user touches with the finger and the like to the control unit 160.

Each touch key unit 140, 150 includes a resin sheet having a transmission part on which marks indicating three keys are formed, an LED backlight which is located below the resin sheet and turns on and off in response to an instruction from the control unit 160 and three electrostatic capacity-type touch sensors arranged at positions corresponding to the respective keys.

When the LED backlight turns on, the light penetrates the transmission part of the resin sheet, so that the marks indicating the three keys of each touch key unit becomes visible. In FIGS. 2 and 3, it is shown that the touch key unit 150 is visible and the touch key unit 140 is invisible.

In the meantime, each touch key unit is used when the user switches the display mode of the portable telephone 100 between the multi-mode and the single mode.

Also, particularly when the display mode is the multi-mode, the control unit 160 has a function of reducing the power consumption in the touch panel unit different from the touch panel unit on which the user performs the operation, in addition to functions of a general portable telephone. Also, the control unit 160 has a function of specifying whether the portable telephone 100 is at the open state or at the closed state, based on the opening/closing state signal output from the opening/closing detection sensor 132.

The control unit 160 includes a key control unit 161, a luminance control unit 162, a panel control unit 163, an application execution unit 164 and a display control unit 165.

Here, the key control unit 161 has a function of turning on only the backlight of the touch key unit of the respective touch key units 140, 150, which is arranged on the same housing as the touch panel unit on which the user has performed the operation at just previous time.

The luminance control unit 162 has functions of controlling brightness of each backlight, based on a signal output from the optical sensor 130, and turning on or off the backlights of the respective touch panel units depending on the display mode and whether the user performs the operation on each touch panel unit.

When the luminance control unit 162 turns off any one backlight and when the detection notification is received, the panel control unit 163 outputs an instruction for switching an operating state to the controller of the touch panel unit including the corresponding backlight and to the controller outputting the detection notification.

The application execution unit 164 has a function of executing processing corresponding to positions on the respective touch panel units, which are indicated by the coordinate value output from the respective controllers 115, 125.

Figure 5:
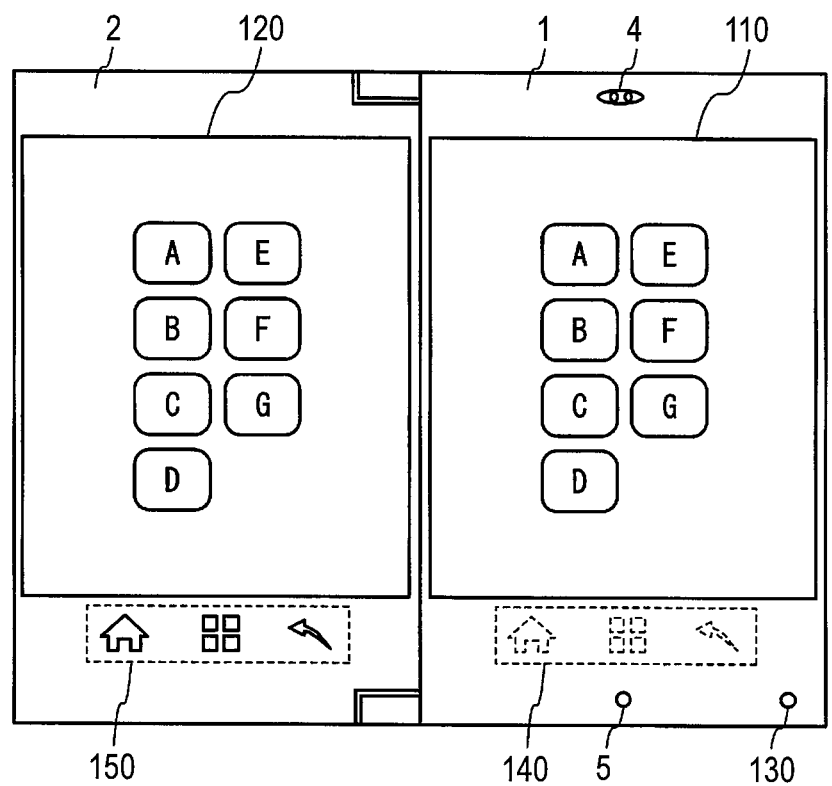
FIG. 5 shows a display example of a menu screen on each touch panel unit.

For example, as shown in FIG. 5, menu screens on which icons A to G for starting various applications are arranged are displayed on the respective touch panel units. In this case, when the user touches the icon A with a finger and the like, the application execution unit 164 starts an application corresponding to the icon A. That is, the application execution unit 164 reads out and executes an application program corresponding to the icon A from the storage unit 131.

In the meantime, the application execution unit 164 can execute two applications of the various applications in time division manner at the same time. Also, as described above, when the user starts an application, the application execution unit stores information (hereinafter, referred to as 'correspondence information'), which indicates a correspondence relation between the touch panel unit on which the starting operation is performed and the application having started, in the storage unit 131.

For example, at the state shown in FIGS. 2A and 2B, the correspondence information indicating that the touch panel unit 110 and the image display application correspond to each other and that the touch panel unit 120 and the call application correspond to each other is stored in the storage unit 131. Also, at the state shown in FIGS. 3A and 3B, for example, when the starting operation of the image display application is performed on the touch panel unit 120, the correspondence information indicating that the touch panel unit 120 and the image display application correspond to each other is stored in the storage unit 131.

Also, the application execution unit 164 has a function of executing processing relating to the key corresponding to a signal output from each touch key unit (for example, processing of switching the display mode between the multi-mode and the single mode).

In the meantime, the application execution unit 164 manages information (hereinafter, referred to as 'mode information) indicating the display mode on the storage unit 131, and when the signal output from each touch key unit corresponds to the key switching the display mode between the multi-mode and the single mode, the application execution unit 164 updates the mode information in the storage unit 131 such that the mode information indicates the display mode after the switching. The respective units in the control unit 160 can recognize whether the current display mode is the multi-mode or single mode by referring to the mode information.

The display control unit 165 has a function of displaying a screen corresponding to a processing result of the application execution unit 164 on each LCD 112, 122. Also, while the luminance control unit 162 turns off any one backlight, the display control unit 165 stops the update of the display on the LCD of the touch panel unit including the backlight that is turned off.

<Operations>

In the below, operations of the portable telephone 100 having the above configuration are described with reference to FIGS. 6 and 7.

Figure 6:
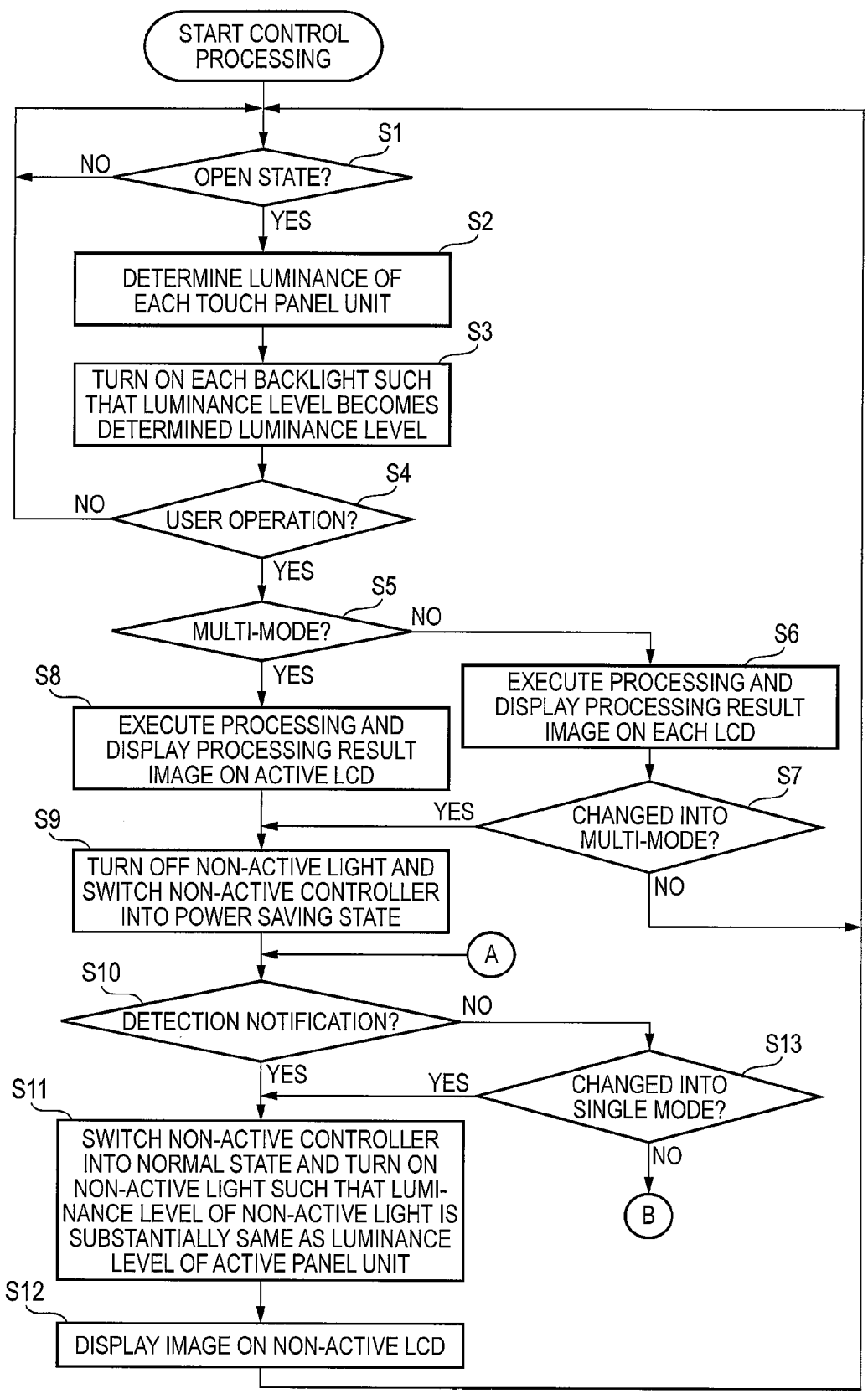
FIG. 6 is a first part of a flowchart showing control processing of the portable telephone.
Figure 7:
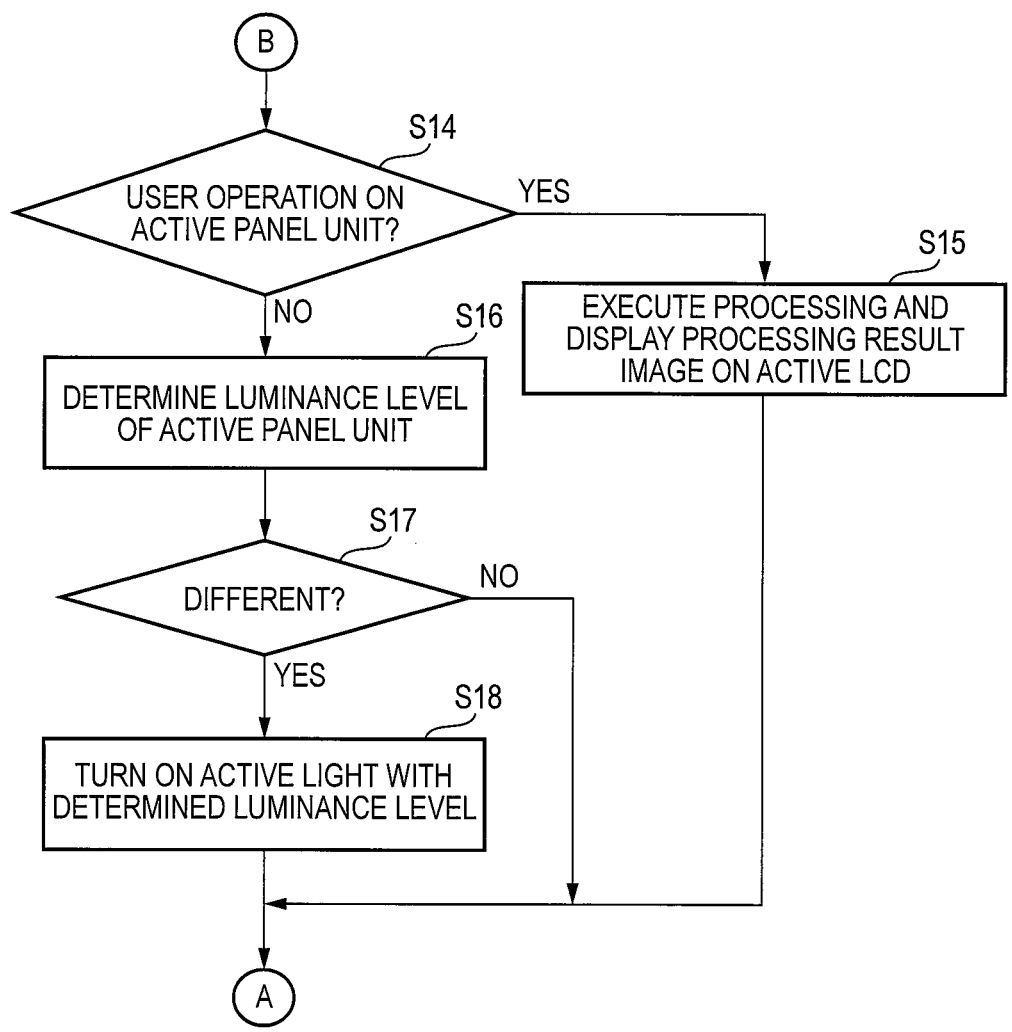
FIG. 7 is a second part of a flowchart showing control processing of the portable telephone.

FIGS. 6 and 7 are flowcharts showing control processing of the portable telephone 100.

The control processing shown in FIGS. 6 and 7 starts when the power of the portable telephone 100 becomes ON and ends when the power becomes OFF (which is not particularly shown).

First, the control unit 160 determines whether the portable telephone 100 is at the open state, based on the opening/closing signal output from the opening/closing detection signal 132 (step S1 in FIG. 6). When it is determined that the portable telephone 100 is not at the open state (step S1: NO), the control unit 160 performs the processing of step S1 again.

When it is determined that the portable telephone 100 is at the open state (step S1: YES), the luminance control unit 162 of the control unit 160 determines a luminance level of each touch panel unit, based on the signal of the voltage level corresponding to the detected brightness, which is output from the optical sensor 130 (step S2).

Figure 8:
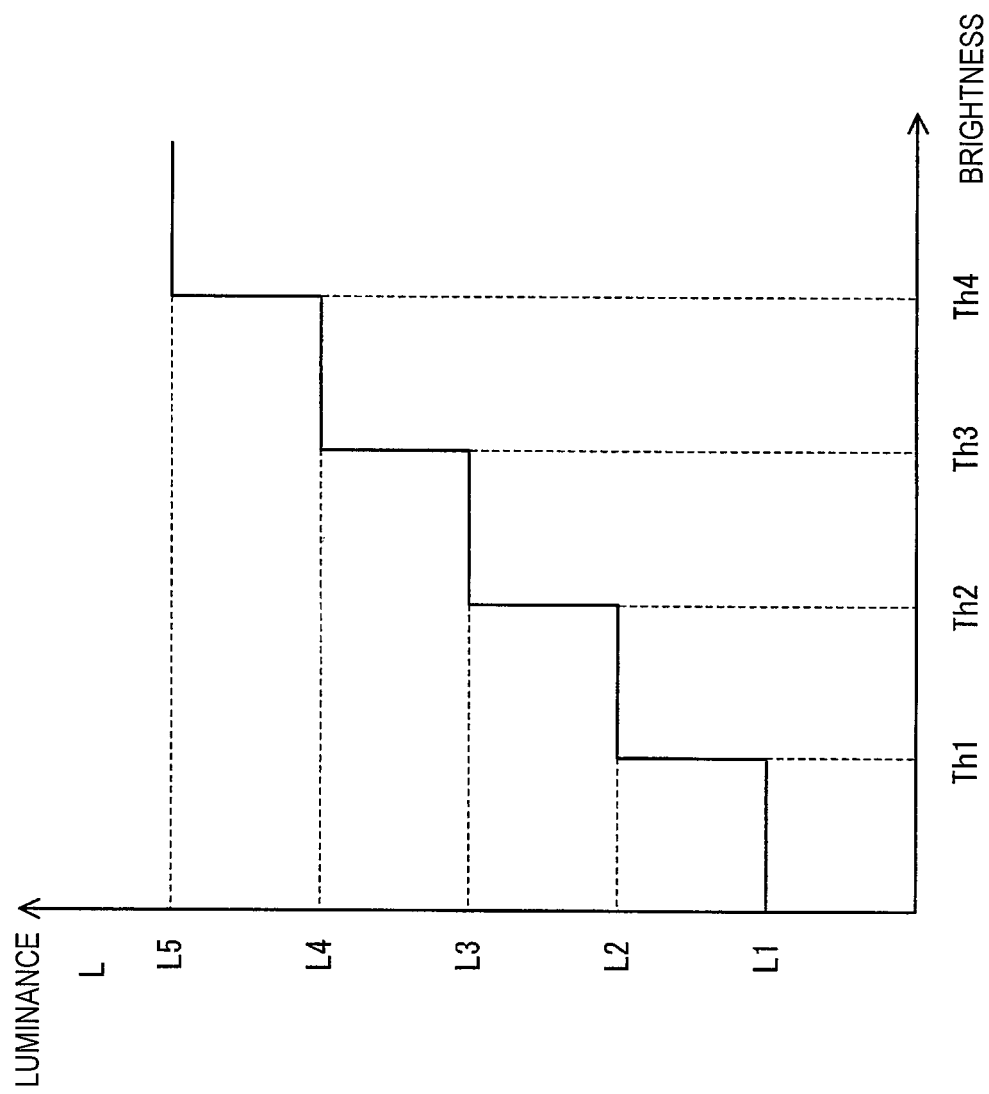
FIG. 8 illustrates a method of determining a luminance level on each touch panel unit.

In the meantime, in this example, as shown in FIG. 8, the respective touch panel units can perform the display at the five luminance levels of L1 to L5.

As shown in FIG. 8, the luminance control unit 162 determines the luminance level of each touch panel unit by using thresholds Th1 to Th4 for dividing a range of the brightness, which is indicated by the signal output from the optical sensor 130, into five levels.

That is, as shown in FIG. 8, when the brightness indicated by the signal output from the optical sensor 130 is below Th1, the luminance control unit determines the luminance levels of the respective touch panel units as 'L1'. When the brightness is Th1 or larger and below Th2, the luminance control unit determines 'L2', when the brightness is Th2 or larger and below Th3, the luminance control unit determines 'L3', when the brightness is Th3 or larger and below Th4, the luminance control unit determines 'L4' and when the brightness is Th4 or larger, the luminance control unit determines 'L5.'

Also, the luminance control unit 162 inputs an amount of current for controlling a luminance level into the luminance level, which is beforehand associated with the luminance level of each touch panel unit determined in step S2, to each backlight, thereby turning on the respective backlights so that the luminance levels of the respective touch panel units become the luminance level determined in step S2 (step S3).

Subsequently, the luminance control unit 162 determines whether the user performs an operation on any one of the touch panel units (step S4). When the coordinate value is not output from any controller, the luminance control unit determines that the user does not perform an operation (step S4: NO) and executes the processing from step S1 again.

When the coordinate value is output from any controller, the luminance control unit 162 determines that the user performs an operation (step S4: YES), and determines whether the current display mode is the multi-mode, based on the mode information stored in the storage unit 131 (step S5).

When the current display mode is the single mode (step S5: NO), the application execution unit 164 executes processing corresponding to the user operation in the application being executed and instructs the display control unit 165 to display a processing result image. The display control unit 165 having received the display instruction displays the processing result image on the LCDs of the respective touch panel units as the mode information of the storage unit 131 indicates the single mode (step S6).

Also, the luminance control unit 162 determines whether the current display mode is changed into the multi-mode, based on the mode information of the storage unit 131 (step S7). When it is determined that the current display mode is changed into the multi-mode (step S7: YES), the control unit 160 performs processing from step S9 (which will be described later). Also, when it is determined that the current display mode is not changed into the multi-mode (step S7: NO), the control unit 160 again performs the processing from step S1.

On the other hand, when it is determined that the current display mode is the single mode (step S5: YES), the application execution unit 164 executes processing corresponding to the user operation in the application being executed which corresponds to the touch panel unit (hereinafter, referred to as 'active panel unit') on which the user operation is performed and instructs the display control unit 165 to display a processing result image. The display control unit 165 having received the display instruction displays the processing result image on only the LCD of the active panel unit because the mode information of the storage unit 131 indicates the multi-mode (step S8). That is, the display image on the LCD of the touch panel unit (hereinafter, referred to as 'non-active panel unit') different from the active panel unit is not updated.

Also, the luminance control unit 162 turns off the backlight of the non-active panel unit (hereinafter, referred to as 'non-active light'). Also, the panel control unit 163 instructs the controller of the non-active panel unit (hereinafter, referred to as 'non-active controller') to switch the operating state thereof and switches the operating state into the power saving state (step S9).

Subsequently, the luminance control unit 162 determines whether the detection notification is received from the non-active controller (step S10). When the detection notification is received (step S10: YES), the panel control unit 163 instructs the non-active controller to switch the operating state thereof and switches the operating state into the normal state. Also, the luminance control unit 162 turns on the non-active light such that the luminance level of the non-active light is the substantially same as the luminance level of the active panel unit (step S11). Specifically, the luminance control unit inputs an amount of the current, which is the same as the amount of the current being input to the backlight of the active panel unit, to the non-active light.

Also, the display control unit 165 displays an image on the LCD of the non-active panel unit (hereinafter, referred to as 'non-active LCD') (step S12). Particularly, when the previous display instruction received from the application execution unit 164 is the instruction made in step S6, an image relating to the previous display instruction is displayed on the non-active LCD. When the processing of step S12 is completed, the control unit 160 performs the processing from step S1 again.

On the other hand, when it is determined in step S10 that the detection notification is not received from the non-active controller (step S10: NO), the luminance control unit 162 determines whether the current display mode is changed into the single mode, based on the mode information stored in the storage unit 131 (step S13). When it is determined that the current display mode is changed into the single mode (step S13: YES), the control unit 160 performs the processing from step S11.

Also, when it is determined that the current display mode is not changed into the single mode (step S13: NO), the luminance control unit 162 determines whether the user operation is made on the active panel unit (step S14 in FIG. 7).

When the coordinate value is output from the controller of the active panel unit, the luminance control unit 162 determines that the user operation is made (step S14: YES) and the application execution unit 164 executes processing corresponding to the user operation in the application being executed which corresponds to the active panel unit, and instructs the display control unit 165 to display a processing result image. The display control unit 165 having received the display instruction displays the processing result image on only the LCD of the active panel unit as the mode information of the storage unit 131 indicates the multi-mode (step S15). When the processing of step S15 is completed, the control unit 160 performs the processing from step S10 again.

Also, when the coordinate value is not output from the controller of the active panel unit, the luminance control unit 162 determines that the user operation is not made (step S14: NO), and determines the luminance level of the active panel unit, based on the signal of the voltage level corresponding to the detected brightness from the optical sensor 130 (step S16), similarly to the processing of step S2.

The luminance control unit 162 determines whether the luminance level of the current active panel unit is different from the luminance level determined in step S16 (step S17). When the luminance levels are different (step S17: YES), the luminance control unit 162 controls the backlight of the active panel unit (active light) such that the luminance level of the active panel unit becomes the luminance level determined in step S16 (step S18), similarly to the processing of step S3.

When the processing of step S18 is completed or when it is determined in step S17 that the luminance level of the current active panel unit is the same as the luminance level determined in step S16 (step S17: NO), the control unit 160 performs the processing from step S10.

<<Others Illustrative Embodiments>>

While the present invention has been shown and described with reference to certain illustrative embodiments thereof, it will be understood by those skilled in the art that various changes in form and details may be made therein without departing from the spirit and scope of the invention as defined by the appended claims.

(1) In the portable telephone 100 of the illustrative embodiment, when the display mode is the multi-mode, the power saving control is performed for the non-active panel unit. That is, the non-active light is turned off, the non-active controller is switched into the power saving state and the display image on the non-active LCD is not updated.

However, irrespective of the display mode, the power saving control may be performed for the non-active panel unit, only the control of turning off the non-active light may be performed, the non-active controller may not be switched into the power saving state and the display image on the non-active LCD may be updated. Also, it may be possible to lower the brightness of the non-active light and to lower the brightness of the non-active panel unit by lowering the amount of current to be input to the non-active light without turning off the non-active light. Also, instead of suddenly turning off the non-active light, the luminance of the non-active light may be lowered every predetermined time after the user operation is made on the active panel unit until the user operation is made on the non-active panel unit. At this time, in the end, the non-active light may be turned off or may be maintained at predetermined brightness.

Also, in the portable telephone 100 of the illustrative embodiment, at the state where the display mode is the multi-mode, when the display mode is switched from the multi-mode to the single mode after the power saving control is performed for the non-active panel unit, the power saving control for the non-active panel unit is released (refer to steps S13: YES, S11 and S12 in FIG. 6). That is, the non-active controller is switched into the normal state, the non-active light is turned on with the substantially same brightness as the backlight of the active panel unit and the display image of the non-active LCD is updated again.

However, even when the display mode is switched from the multi-mode to the single mode after the power saving control is performed for the non-active panel unit, the power saving control for the non-active panel unit may not be released.

Also, in the portable telephone 100 of the illustrative embodiment, at the state where the display mode is the single mode, when the display mode is switched from the single mode to the multi-mode, the power saving control is performed for the non-active panel unit (refer to step S7: YES in FIG. 6).

However, at the state where the display mode is the single mode, even when the display mode is switched from the single mode to the multi-mode, the power saving control for the non-active panel unit may not be performed.

(2) In the illustrative embodiment, the display mode of the portable telephone 100 is switched by operating each touch key unit. However, the display mode may be switched, based on the other operation, for example, a predetermined operation on each touch panel unit.

In this case, it is required that the application execution unit 164 of the portable telephone 100 would be modified to detect the predetermined operation on each touch panel unit. Hereinafter, the portable telephone and the application execution unit of this modified embodiment are referred to as a 'modified portable telephone' and a 'modified application execution unit.'

Figure 9A:
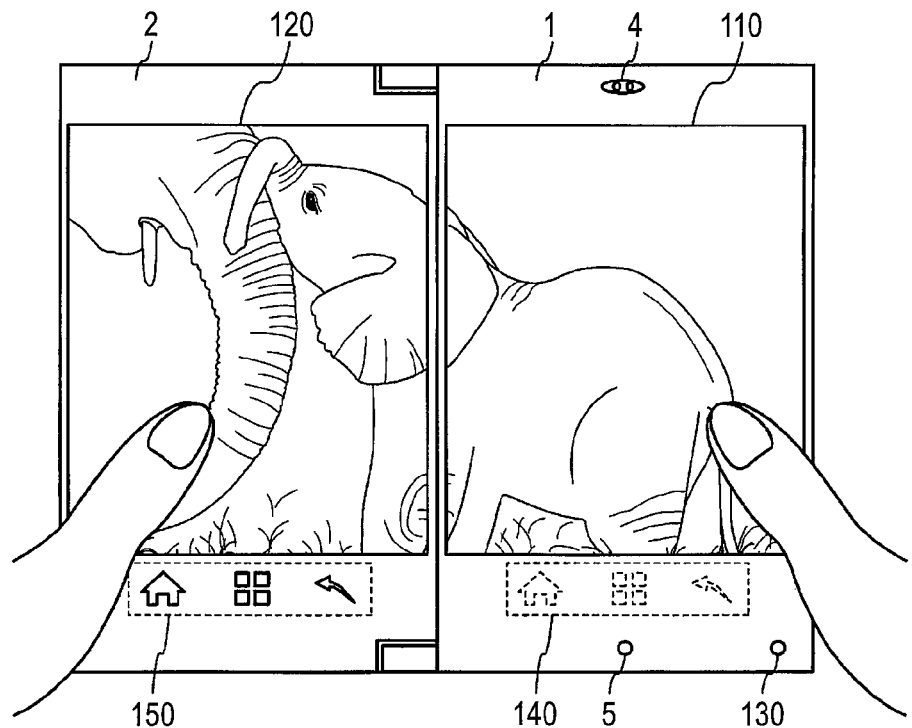
FIGS. 9A and 9B show display examples on respective touch panel units and a user operation example in a modified portable telephone.
Figure 9B:
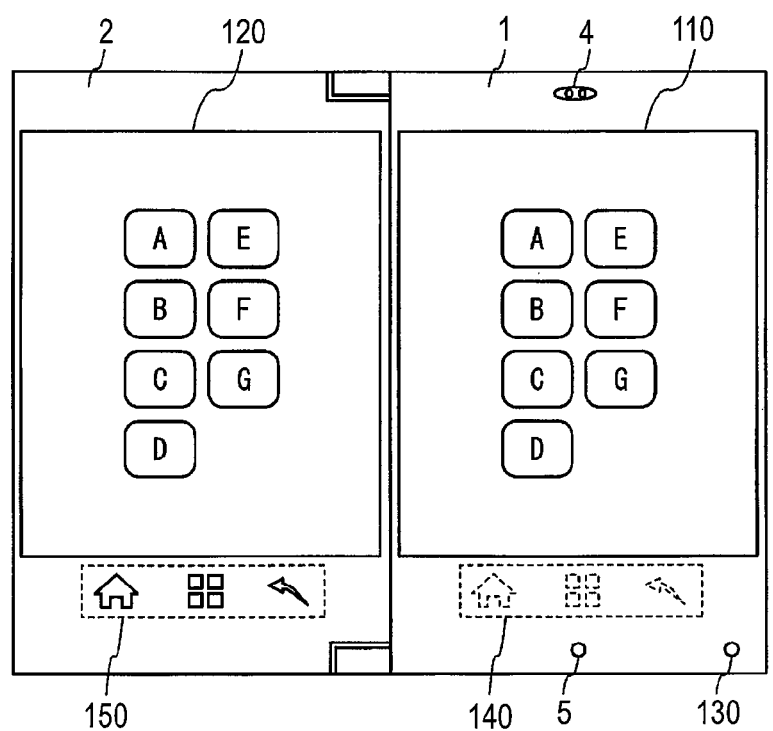

FIGS. 9A and 9B show display examples on respective touch panel units and a user operation example in the modified portable telephone.

FIG. 9A shows that the user touches the respective touch panels units with fingers when one image (photograph image) instructed from the image display application is divided and displayed on the touch panel units 110, 120.

When the modified application execution unit detects that the user touches the respective touch panels units 110, 120 with fingers and the like for predetermined time or longer, the modified portable telephone displays the menu screens on the respective touch panel units, as shown in FIG. 9B.

At a state of FIG. 9B, when the user touches a display position of an icon A displayed on the touch panel unit 110 and a display position of an icon B displayed on the touch panel unit 120 with the fingers and the like, the modified application execution unit starts an application corresponding to the icon A and an application corresponding to the icon B and updates the mode information of the storage unit 131 so that the mode information indicates the multi-mode.

That is, in the modified portable telephone, it is possible to switch the display mode, based on the operation on the respective touch panel units, in which the user touches the respective touch panel units with the fingers and the like at the same time for predetermined time or longer.

Here, a case has been described in which the display mode is switched from the single mode to the multi-mode. However, when the display mode is the multi-mode, it is possible to switch the display mode into the single mode, based on the operation on the respective touch panel units, in which the user touches the respective touch panel units with the fingers and the like at the same time for predetermined time or longer.

(3) In the illustrative embodiment, the luminance control unit 162 determines the luminance levels of the respective touch panel units, depending on the surrounding brightness detected by the optical sensor 130. However, the luminance level may be determined by the other methods.

For example, the luminance control unit 162 may be modified to determine the luminance level depending on a user operation of pressing a button for adjusting (decreasing or increasing) of the luminance of the respective touch panel units. Meanwhile, the button may be a hardware button or software button displayed on each touch panel unit 110, 120.

Also, in the illustrative embodiment, the luminance level of each touch panel units has the five levels of L1 to L5. However, the luminance level is not limited to the five levels. For example, the luminance level may be more or less than the five levels inasmuch as the luminance level is one level (i.e., the luminance level at the time of lighting is a fixed level) or more, and the user may be allowed to select an option for the number of levels.

(4) In the illustrative embodiment, the luminance of each touch panel unit is controlled by the amount of current input to each backlight. However, the luminance may be controlled by repeatedly turning on and off the respective backlights (LEDs) at high speed (so-called PWM (Pulse Width Modulation) control).

Also, in the illustrative embodiment, each backlight is the edge light-type LED backlight. However, a direct-type backlight may be also used, instead of the edge light-type. Alternatively, the other light sources (for example, cold cathode tube, bulb, hot cathode tube and the like) other than the LED backlight may be used.

(5) In the illustrative embodiment, the portable telephone 100 includes one processor and the application execution unit 164 executes two applications of the various applications in time division manner at the same time. However, the portable telephone 100 may include two processors and each processor may execute one application, so that two applications are executed in parallel.

(6) The portable telephone 100 of the illustrative embodiment has the touch panel unit 110 and the touch panel unit 120 which are arranged on the substantially same plane, at the open state as shown in FIG. 1C. However, any arrangement may be possible inasmuch as the user can see the screens of the respective touch panel units.

For example, at the open state, the main plane including the touch panel unit 110 of the first housing 1 and the main plane including the touch panel unit 120 of the second housing 2 may be arranged to be substantially parallel. Alternatively, the main plane including the touch panel unit 110 of the first housing 1 and the main plane including the touch panel unit 120 of the second housing 2 may be inclined at an angle in which the user can see the screens of the respective touch panel units.

Also, in the illustrative embodiment, the shape of each LCD 110, 120 is substantially rectangular. However, the shape may be circular or polygonal. Also, the number of pixels of each LCD may be the same or different.

The respective touch panel unit 110, 120 include the respective LCDs 112, 122. However, each touch panel unit may include an organic EL (Electro-Luminescence) and the like.

Also, the portable telephone 100 of the illustrative embodiment has two touch panel units. However, the portable telephone may have three or more touch panel units.

That is, for a portable telephone having three or more touch panel units, when an input on one touch panel unit is detected, the display luminance of the other two or more touch panel units except for the one touch panel unit may be decreased below the current luminance.

(7) The portable telephone 100 of the illustrative embodiment is a slide-type portable telephone. However, portable telephones having other appearances such as folder-type and straight-type portable telephones are also possible inasmuch as a plurality of touch panel units is provided thereto.

(8) The touch sensor of the illustrative embodiment is an electrostatic capacity-type touch sensor. However, regarding the electrostatic capacity-type touch sensor, a projection type in which a plurality of electrode patterns is formed on a substrate such as plastic, glass and the like and a ratio of amounts of current of the electrode patterns adjacent to a touch point is measured to determine a touch position, a plane type in which a conductive film and a substrate are provided, electrodes are provided to corners of the substrate, a uniform electric field by the conductive film is formed and a ratio of amounts of current of corner terminals by the finger touch and the like is measured to determine a touch position, and the like may be appropriately used.

Also, each touch sensor is not limited to the electrostatic capacity-type touch sensor. For example, an electromagnetic induction type in which a dedicated pen such as electronic pen is used, a matrix switch type in which a transparent electrode having a two-layer structure is provided, a resistance film type in which a voltage is applied to one of two resistance films and a voltage corresponding to an operation position on the other resistance film is detected, a surface elastic wave type in which rebound of a vibrational wave is detected by a voltage change of a piezoelectric device and thus touch of a finger and the like is detected, an infrared type in which a touch position of a finger and the like is detected by shielded infrared, an optical sensor type in which an optical sensor is incorporated into a screen and a touch position is thus detected, and the like may be appropriately used.

(9) A part or all of the respective constitutional elements described in the illustrative embodiment may be implemented by one chip or an integrated circuit having a plurality of chips, may be implemented by a computer program and may be implemented by the other configurations.

Also, the respective constitutional elements described in the illustrative embodiment cooperate with the processor of the portable telephone, thereby implementing the functions thereof.

(10) A program enabling the processor to execute the control processing (refer to FIG. 6) of the portable telephone described in the illustrative embodiment may be recorded in a recording medium or circulated and distributed through a variety of communication paths and the like. The recording medium may be an IC card, a hard disk, an optical disk, a flexible disk, a ROM, a flash memory and the like. The circulated and distributed program is stored and used in a memory and the like that can be read by a processor of a device. The processor executes the program, thereby implementing the respective functions of the portable telephone described in the illustrative embodiment.

(11) A part or all of (1) to (10) may be combined and applied to the portable telephone of the illustrative embodiment.

(12) In the below, configurations of a portable terminal and a display apparatus according to an illustrative embodiment, a modified embodiment thereof and respective effects are additionally described.

(a) According to an illustrative embodiment, there is provided a portable terminal comprising: a plurality of display units; and a luminance control unit which, in response to an input operation performed at a state where images are visibly displayed on the respective display units, performs a luminance control of decreasing a display luminance of another display unit of the plurality of display units to be lower than a current luminance thereof, the other display unit being different from a display unit for which the input operation is performed.

According to another illustrative embodiment, there is provided a display apparatus comprising: a plurality of display units; and a plurality of display units; and a luminance control unit which, in response to an input operation performed at a state where images are visibly displayed on the respective display units, performs a luminance control of decreasing a display luminance of another display unit of the plurality of display units to be lower than a current luminance thereof, the other display unit being different from a display unit for which the input operation is performed.

Here, the state where the images are visibly displayed on the respective display units refers to any state except for a state where a light emitting part (for example, a backlight of a liquid crystal display, a light emitting layer of an organic EL display and the like) configuring each display unit does not emit the light completely.

According to the portable terminal and the display apparatus, when the user performs an input operation, it is possible to decrease the display luminance of the other display unit which does not correspond to the input operation. Therefore, it is possible to suppress the power consumption of the device as a whole even when the user performs the operation.

(b) In the above, the luminance control unit may maintain a display luminance of the display unit for which the input operation is performed, in the luminance control.

Also, in the above, the portable terminal may include a plurality of touch panel units which include the display units mutually different, respectively, and detect a touch input operation, and the luminance control unit may perform the luminance control by using a display unit which is included in a touch panel unit of the touch panel units, on which a touch input operation is detected, as the display unit, and a display unit which is included in a touch panel unit of the touch panel units different from the touch panel unit, as the other display unit.

According to the above configuration, when the user performs an input operation, the display luminance of the display unit corresponding to the input operation is maintained. Therefore, by decreasing the display luminance of the other display unit which does not correspond to the input operation, it is possible to suppress the power consumption of the device as a whole and to maintain the operability even when the user performs the operation.

(c) Further, the above portable terminal may further comprise a display control unit which controls the respective display units to display images instructed by an application being executed, and the luminance control unit performs the luminance control, on a condition that the images displayed on the respective display units by the display control unit when the touch input operation is detected on any one touch panel unit are images respectively instructed by different applications.

The relevance between the respective images when the images displayed on the respective display units are the images respectively instructed by the different applications is lower than the relevance between the respective images when the images displayed on the respective display units are the images instructed by a same application. Also, it is thought that the operability is not deteriorated largely even though the visibility of the other display unit, which does not correspond to the input operation, is lowered.

According to the above portable terminal, when the images displayed on the respective display units are the images instructed by the different applications, i.e., only when it is supposed that the relevance between the respective images being displayed is relatively low, the display luminance of the display unit, which is included in the touch panel unit different from the touch panel unit on which the user performs the operation, is decreased. Therefore, it is possible to maintain the operability.

(d) Further, in the above, after performing the luminance control, the luminance control unit may further perform control of increasing the display luminance of the other display unit to a substantially same level as the display luminance of the display unit when the images displayed on the respective display units by the display control unit are changed into images instructed by a same application.

According to the above portable terminal, when the images, which are displayed on the respective display units, are changed into the images instructed by the same application, i.e., when it is supposed that the relevance between the respective images being displayed becomes higher than till then, the luminance of the other display unit for which the display luminance has been decreased is increased. Therefore, it is possible to maintain the operability.

(e) Further, in the above, the luminance control unit may perform the luminance control, on a condition that in a case where the images displayed on the respective display units by the display control unit when the touch input operation is detected on any one touch panel unit, are the images instructed by a same application, the images displayed on the respective display units are changed into the images respectively instructed by different applications.

According to the portable terminal, when the images displayed on the respective display units are changed into the images instructed by the different applications, i.e., when it is supposed that the relevance between the respective images being displayed becomes lower than till then, the display luminance of the display unit of the touch panel unit on which the user does not perform the operation is decreased. Therefore, it is possible to suppress the power consumption while securely maintaining the operability.

(f) Further, in the above, each of the display units may include a liquid crystal display and a backlight which emits light with brightness corresponding to an amount of input current, and the luminance control unit may perform the luminance control by decreasing the amount of current input to the backlight of the other display unit.

According to the portable terminal, when each display unit includes the liquid crystal display, the amount of current, which is input to the backlight included in the other display unit that does not correspond to the user's input operation, is decreased. Thereby, it is possible to suppress the power consumption relatively simply.

(g) Further, in the above, the luminance control unit may perform the luminance control by stopping the current input to the backlight of the second display unit, and the portable terminal may further comprise a display control unit which controls the respective display units to display images instructed by an application being executed before the luminance control unit performs the luminance control, and control the other display unit not to display an image instructed by an application being executed after the luminance control unit performs the luminance control.

According to the above portable terminal, the current input to the backlight, which is included in the other display unit which does not correspond to the user's input operation, is stopped and the image instructed by the application is not displayed on the other display unit. Therefore, it is possible to further suppress the power consumption of the portable terminal.

(h) Further, in the above, after performing the luminance control, the luminance control unit may further perform control of increasing the display luminance of the other display unit to the substantially same level as the display luminance of the display unit when the touch input operation is detected on the touch panel unit including the other display unit.

According to the above portable terminal, when the user performs the operation on the touch panel unit including the other display unit for which the display luminance has been once decreased, the display luminance of the other display unit is increased. Thus, it is possible to maintain the operability.

(i) Further, in the above, each of the touch panel units may include a controller which, in response to an instruction, switches an operating state between a normal state where the touch input operation is detected and a coordinate value indicating a position of the detected input operation is output and a power saving state where when the touch input operation is detected, a notification indicating that the input operation is detected is output without outputting the coordinate value, and the portable terminal may further comprise a panel control unit which instructs the controller of the touch panel unit which includes the other display unit to switch the operating state into the power saving state when the luminance control unit performs the luminance control, and instructs the controller to switch the operating state into the normal state when the notification is output from the controller.

According to the above portable terminal, when the user performs the operation on any one touch panel unit, the controller of the touch panel unit different from the corresponding touch panel unit is switched into the power saving state where the coordinate value of the touch position is not output. Accordingly, it is possible to further suppress the power consumption of the portable terminal as a whole.

The portable terminal can be used to display and use the images on the plurality of display units.

What is claimed is:

1. A portable terminal comprising:
   a plurality of display units; and
   a luminance control unit which
     determines whether, at a state where images are visibly displayed on the respective display units, a current display mode is a multi-mode in which the images displayed on the respective display units are images respectively instructed by different applications, and
     when it is determined that the current display mode is the multi-mode, in response to an input operation to the application executing in a first display unit of the plurality of display units, performs a luminance control, while in the multi-mode display mode, of decreasing a display luminance of a second display unit of the plurality of display units to be lower than a current luminance thereof, the second display unit being separate from the first display unit,
   wherein after performing the luminance control, the luminance control unit further performs control of increasing the display luminance of the second display unit to a substantially same level as the display luminance of the first display unit when the images displayed on the respective display units are instructed to display images by a same application.

2. The portable terminal according to claim 1,
   wherein the luminance control unit maintains a display luminance of the first display unit for which the input operation is performed, in the luminance control.

3. The portable terminal according to claim 1,
   wherein the portable terminal includes a plurality of touch panel units which include the display units mutually different, respectively, and detect a touch input operation, and
   wherein the first display unit is included in a first touch panel unit of the touch panel units, on which a touch input operation is detected, and the second display unit is included in a second touch panel unit of the touch panel units different from the first touch panel unit.

4. The portable terminal according to claim 3, further comprising:
   a display control unit which controls the respective display units to display images instructed by an application being executed,
   wherein the luminance control unit performs the luminance control, on a condition that the images displayed on the respective display units by the display control unit when the touch input operation is detected on any one touch panel unit are images respectively instructed by different applications.

5. The portable terminal according to claim 4,
   wherein the luminance control unit performs the luminance control, on a condition that in a case where the images displayed on the respective display units by the display control unit when the touch input operation is detected on any one touch panel unit, are the images instructed by a same application, the images displayed on the respective display units are changed into the images respectively instructed by different applications.

6. The portable terminal according to claim 3,
   wherein after performing the luminance control, the luminance control unit further performs control of increasing the display luminance of the second display unit to the substantially same level as the display luminance of the first display unit when the touch input operation is detected on the touch panel unit including the second display unit.

7. The portable terminal according to claim 3,
   wherein each of the touch panel units includes a controller which, in response to an instruction, switches an operating state between a normal state where the touch input operation is detected and a coordinate value indicating a position of the detected input operation is output and a power saving state where when the touch input operation is detected, a notification indicating that the input operation is detected is output without outputting the coordinate value,
   the portable terminal further comprising:
     a panel control unit which instructs the controller of the touch panel unit which includes the second display unit to switch the operating state into the power saving state when the luminance control unit performs the luminance control, and instructs the controller to switch the operating state into the normal state when the notification is output from the controller.

8. The portable terminal according to claim 1,
   wherein each of the display units includes a liquid crystal display and a backlight which emits light with brightness corresponding to an amount of input current, and
   wherein the luminance control unit performs the luminance control by decreasing the amount of current input to the backlight of the second display unit.

9. The portable terminal according to claim 8,
wherein the luminance control unit performs the luminance control by stopping the current input to the backlight of the second display unit,
the portable terminal further comprising:
a display control unit which controls the respective display units to display images instructed by an application being executed before the luminance control unit performs the luminance control, and control the second display unit not to display an image instructed by an application being executed after the luminance control unit performs the luminance control.

10. The portable terminal according to claim 1,
wherein the luminance control unit
determines whether, at the state where images are visibly displayed on the respective display units, the current display mode is the multi-mode or a single mode in which the images displayed on the respective display units are images instructed by a single application, and,
when it is determined that the current display mode is the single-mode, in response to the input operation performed for the first display unit, does not perform the luminance control, the luminance control being a control of decreasing the display luminance of the second display unit to be lower than the current luminance thereof and to be lower than the luminance of the first display unit.

11. A display apparatus comprising:
a plurality of display units; and
a luminance control unit which
determines whether, at a state where images are visibly displayed on the respective display units, a current display mode is a multi-mode in which the images displayed on the respective display units are images respectively instructed by different applications, and
when it is determined that the current display mode is the multi-mode, in response to an input operation to the application executing in a first display unit of the plurality of display units at a state images are visibly displayed on the respective display units, performs a luminance control, while in the multi-mode display mode, of decreasing a display luminance of a second display unit of the plurality of display units to be lower than a current luminance thereof, the second display unit being separate from the first display unit,
wherein after performing the luminance control, the luminance control unit further performs control of increasing the display luminance of the second display unit to a substantially same level as the display luminance of the first display unit when the images displayed on the respective display units are instructed to display images by a same application.

12. The display apparatus according to claim 11,
wherein the luminance control unit
determines whether, at the state where images are visibly displayed on the respective display units, the current display mode is the multi-mode or a single mode in which the images displayed on the respective display units are images instructed by a single application, and,
when it is determined that the current display mode is the single-mode, in response to the input operation performed for the first display unit, does not perform the luminance control, the luminance control being a control of decreasing the display luminance of the second display unit to be lower than the current luminance thereof and to be lower than the luminance of the first display unit.

13. A luminance control method in a portable terminal having a plurality of display units, the luminance control method comprising:
determining whether, at a state where images are visibly displayed on the respective display units, a current display mode is a multi-mode in which the images displayed on the respective display units are images respectively instructed by different applications, and
when it is determined that the current display mode is the multi-mode, in response to an input operation to the application executing in a first display unit of the plurality of display units at a state where images are visibly displayed on the respective display units, performing luminance control, while in the multi-mode display mode, of decreasing a display luminance of a second display unit of the plurality of display units to be lower than a current luminance thereof, the second display unit being separate from the first display unit,
wherein after performing the luminance control, further performing control of increasing the display luminance of the second display unit to a substantially same level as the display luminance of the first display unit when the images displayed on the respective display units are instructed to display images by a same application.

14. The luminance control method according to claim 13, further comprising:
determining whether, at the state where images are visibly displayed on the respective display units, the current display mode is the multi-mode or a single mode in which the images displayed on the respective display units are images instructed by a single application, and,
when it is determined that the current display mode is the single-mode, in response to the input operation performed for the first display unit, not performing the luminance control, the luminance control being a control of decreasing the display luminance of the second display unit to be lower than the current luminance thereof and to be lower than the luminance of the first display unit.

15. A non-transitory computer readable storage medium having a control program stored thereon and readable by a processor of a portable terminal including a plurality of display units, when executed by the processor, causing the processor to perform operations comprising:
determining whether, at a state where images are visibly displayed on the respective display units, a current display mode is a multi-mode in which the images displayed on the respective display units are images respectively instructed by different applications, and
when it is determined that the current display mode is the multi-mode, in response to an input operation to the application executing in a first display unit of the plurality of display units at a state where images are visibly displayed on the respective display units, performing luminance control, while in the multi-mode display mode, of decreasing a display luminance of a second display unit of the plurality of display units to be lower than a current luminance thereof, the second display unit being separate from the first display unit,
wherein after performing the luminance control, further performing control of increasing the display luminance of the second display unit to a substantially same level as the display luminance of the first display unit when the images displayed on the respective display units are instructed to display images by a same application.

16. The non-transitory computer readable storage medium according to claim 15, further comprising:

determining whether, at the state where images are visibly displayed on the respective display units, the current display mode is the multi-mode or a single mode in which the images displayed on the respective display units are images instructed by a single application, and, when it is determined that the current display mode is the single-mode, in response to the input operation performed for the first display unit, not performing the luminance control, the luminance control being a control of decreasing the display luminance of the second display unit to be lower than the current luminance thereof and to be lower than the luminance of the first display unit.

* * * * *